Sept. 20, 1971                O. G. JEDDELOH                3,606,011
                     LUMBER SORTING METHOD AND APPARATUS
Filed June 27, 1969                                     2 Sheets-Sheet 1

Otto G. Jeddeloh
INVENTOR
BY Kolisch & Hartwell
Attys

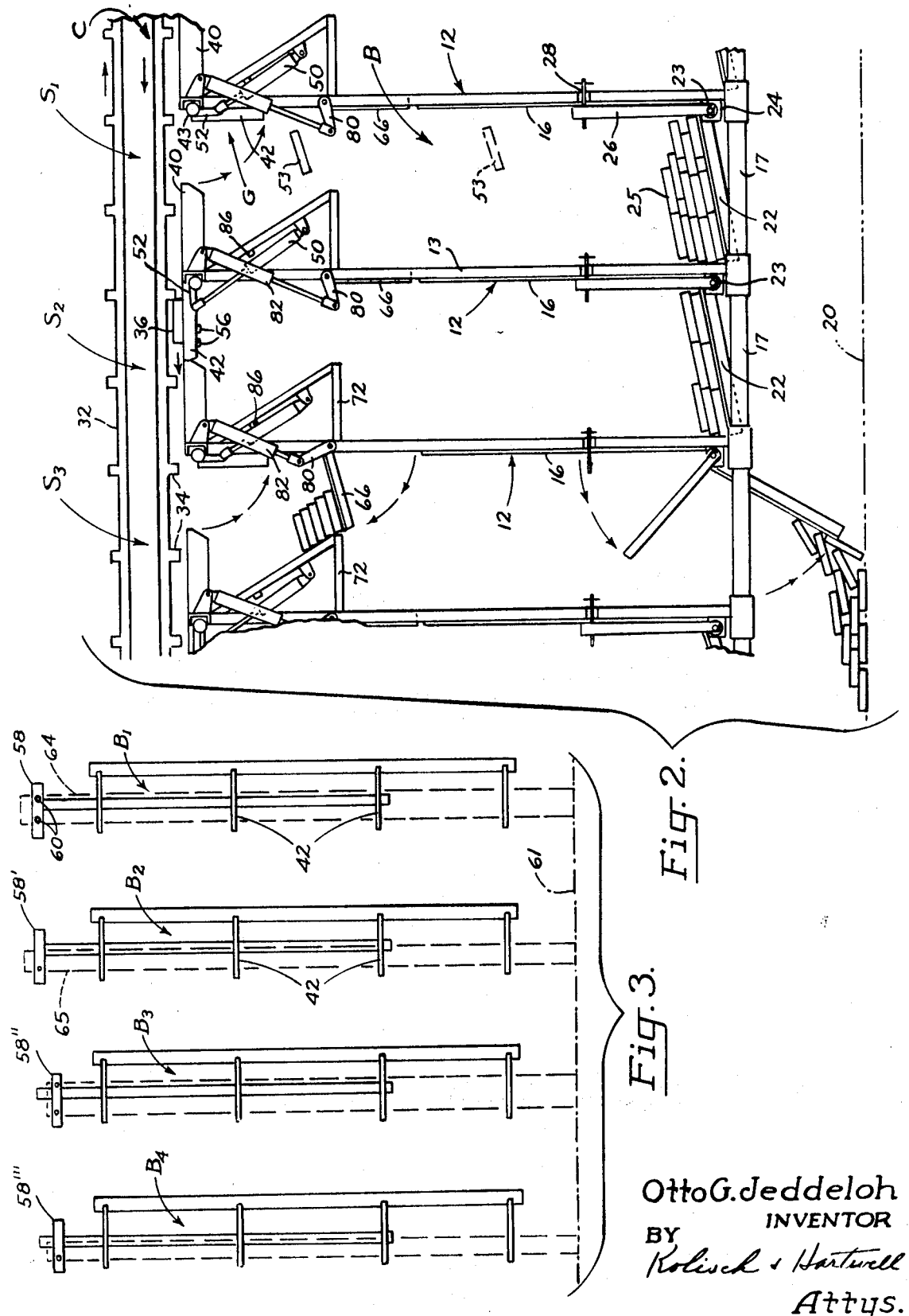

United States Patent Office 3,606,011
Patented Sept. 20, 1971

3,606,011
LUMBER SORTING METHOD AND APPARATUS
Otto G. Jeddeloh, Medford, Oreg., assignor to Oregon Cutstock and Moulding Corp., White City, Oreg.
Filed June 27, 1969, Ser. No. 837,257
Int. Cl. B07c 5/04
U.S. Cl. 209—73                                     8 Claims

ABSTRACT OF THE DISCLOSURE

A method and apparatus for sorting lumber. The method includes conveying a board laterally to a sorting station and then rapidly dropping the support from under the board whereby it falls essentially in the position it had while conveyed and without turning over on its edge. The apparatus includes a conveyer for moving boards laterally, one at a time, with conveying force imparted by contacting edges of the boards. The boards are conveyed over a horizontally disposed drop gate in a sorting station, which is hingedly mounted at its upstream margin to accommodate swinging of its downstream margin downwardly to drop a board into a bin. A motor is connected to the gate for powering its swinging movement. The apparatus also includes means at the bottom of the bin for unloading boards from the bin, and an accumulator between the gate and bottom of the bin for accumulating boards during unloading of the bottom of the bin. The apparatus features a modular type of construction permitting the number of sorts produced in a sorting line to be varied.

---

This invention relates to a method and apparatus for sorting lumber.

A general object of the invention is to provide novel apparatus for sorting lumber which drops selected boards into a bin with minimum turning of the boards occurring as they fall, thus reducing edge damage to the boards, and inhibiting skewing tendencies in the boards as they collect.

More specifically, an object is to provide in such apparatus a substantially horizontal drop gate onto which a board may be moved by a conveyor with the underside of the board being supported solely by the gate. The gate is hingedly mounted at its upstream margin, permitting its downstream margin to be swung downwardly rapidly and under power, to remove abruptly all support from the board so that it falls in substantially the position that it was conveyed into a bin beneath the gate. In this way little, if any, rotational force is imparted to the board, and it tends to come to rest in the bin without edge damage and excessive skewing.

Another object of the invention is to provide a novel method for sorting lumber in which a board is conveyed along a support to a sorting station where the support is dropped from under the board in such a manner that the board falls freely into a bin with minimum rotation.

Still another object is to provide novel apparatus for sorting lumber which includes a bin into which boards are dropped on being sorted, means at the bottom of the bin for unloading boards from the bin, and an accumulator above the bottom of the bin which is movable between a normally open position where it permits boards to fall freely to the bottom of the bin and an accumulating position where it reaains boards to permit unloading of the bottom of the bin without interference from falling boards.

These and other objects and advantages will become more fully apparent as the following description is read in conjunction with the drawings, wherein:

FIG. 2 is a side elevation of portions of the apparatus, showing a number of sorting stations, including bins provided for the collection of lumber; and FIG. 3 is a simplified, top plan view of portions of the apparatus.

Figure 1:
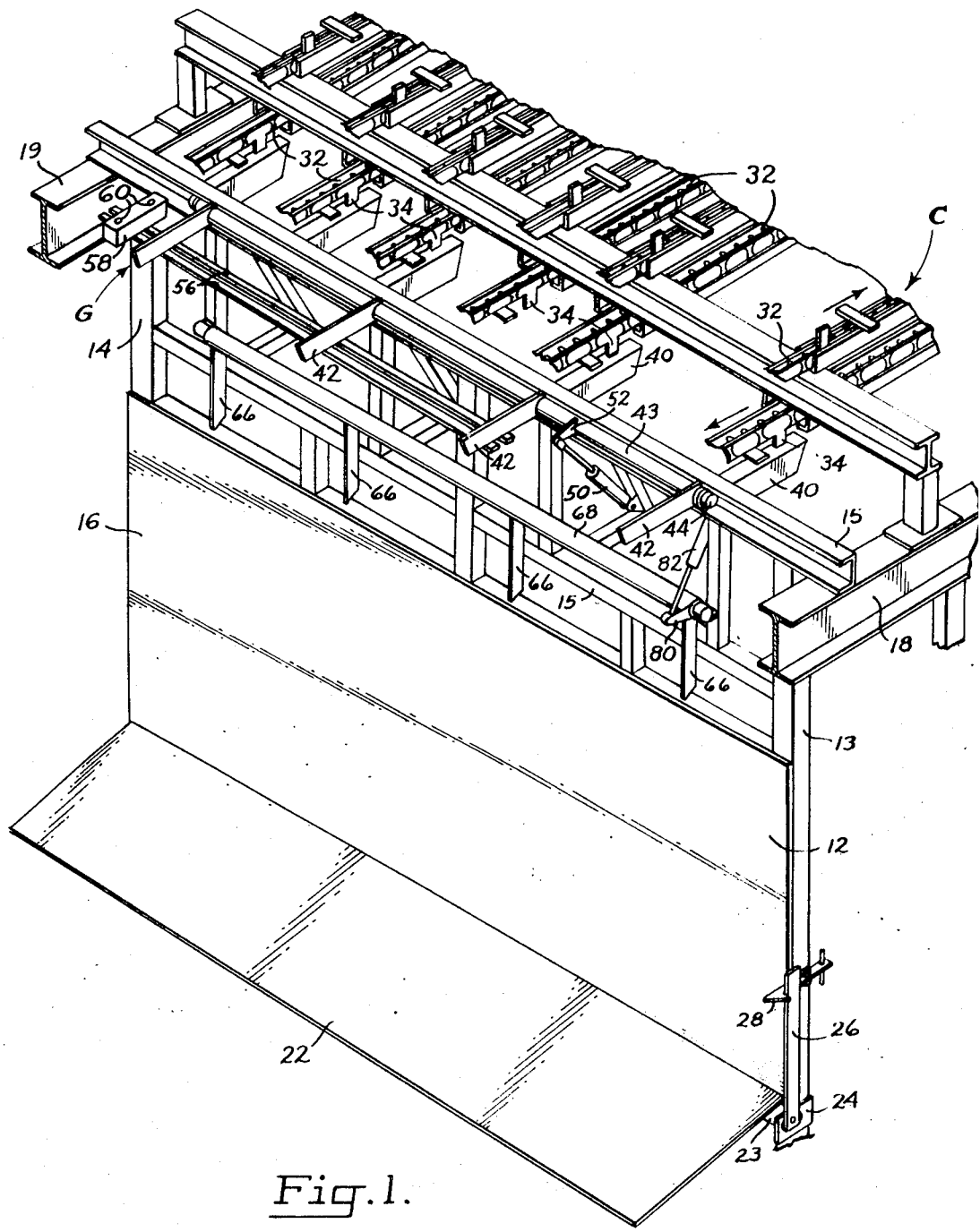
FIG. 1 is a perspective view of portions of a lumber sorting apparatus constructed in accordance with an embodiment of the invention showing a sorting station which forms a module in the apparatus.

As probably most clearly illustrated in FIG. 2, the sorting apparatus of the invention may comprise a series of sorting stations shown generally at $S_1$, $S_2$, and $S_3$ disposed one after another and forming a sorting line in the apparatus. As illustrated with reference to sorting station $S_1$ in FIG. 2, each includes a bin B receiving lumber sorted out in the station, and a gate mechanism indicated generally at G which is actuatable to be opened up to enable a piece of lumber to drop from the sorting line into the bin. Lumber is moved along the sorting line by a conveyer designated generally at C.

The various bins B in the apparatus are defined by a series of upright support frames such as those shown at 12. As best illustrated perhaps in FIG. 1 each support frame includes side posts, 13 and 14, suitable strengtheners extending between the posts, such as the one shown at 15, and a panel extending along a side of the frame such as that shown at 16, all suitably rigidly joined together.

In the sorting line the various support frames are appropriately mounted whereby they are rigidly held in their laterally spaced relation shown in FIG. 2. Thus, bars 17 may be included between the separate support frames which bars are suitably secured adjacent their opposite ends to the support frame. As seen in FIG. 1, and securing the top of the support frames together are elongated beams 18 and 19. Other structure securing the support frames in place has been omitted from the drawings for the reasons of clarity. It will be seen in FIG. 2 that such support structure supports the frames in a position elevated above a conveyer 20, illustrated in dashed outline.

Explaining the construction of a bin, a collector 22 in the form of an elongated frame supported plate is pivotally mounted along one of its margins adjacent the base of each bin. The pivot connection is provided by an elongated pivot pin 23, secured to the collector and having ends journaled in pads such as pad 24 that are fixed to one of the two support frames that define the bin. Each collector, when in the substantially horizontal position shown for the collector with respect to bin B, spans the distance between the two support frames that form opposite sides of the bin, thus to form a bottom for the bin. When in this substantially horizontal position the collector collects boards dropped into the bin as represented by boards 25.

A handle 26 is provided for each collector which is secured to the end of the collector's pivot pin 23. The handle is latched in a substantially vertical position by a latch mechanism best illustrated in FIG. 1. The latch mechanism includes a latch member 28 which may be pivoted away from the handle 26 in FIG. 1 to release the handle. On release, gravity by pulling down the collector operates to swing it downwardly, as illustrated for the left hand bin illustrated in FIG. 2. This operates to deposit any boards that have collected on the collector on the conveyer 20. The collector is returned to its substantially horizontal position by swinging the handle back to its essentially vertical position.

As seen in FIGS. 1 and 2, conveyer C comprises a series of laterally spaced, elongated, endless conveyer chains 32. Each chain has a lower horizontal reach extending over the bins. Each chain has spaced-apart lugs 34 thereon, which project downwardly from this lower reach of the chain. The lugs on each chain are aligned with corresponding lugs on the other chains in a direction extending across the apparatus. The conveyer chains are driven by a suitable motor (not shown), which on actuation moves the lower reaches of the chains in a downstream direction in the apparatus, or to the left in FIGS. 1 and 2.

The conveyer chains are adapted to move boards, such as the one illustrated at 36 in FIG. 2, one after another, along a path extending over the bins, with the boards moving laterally. An aligned set of lugs 34 on the chains engage the rear edge of a board, whereby the chains move the board without contacting its underside.

Support for the underside of a board as such moves over the bins is provided in each sorting station by a series of parallel, laterally spaced, horizontal arms 40 which are secured to and project in an upstream direction (or against the direction in which boards are conveyed) from the top of a support frame. Additional support is provided by another set of arms 42, which project substantially horizontally in a downstream direction from the top of a support frame. As is seen in FIG. 2, the upper surfaces of arms 40, 42 for the center bin in the line occupy the same horizontal plane, and thus provide a continuous planar support for boards.

Arms 42 in each sorting station are secured at their upstream set of ends to an elongated hinge shaft 43 which is journaled in bearings 44 adjacent the top of a support frame. Arms 42 in a station collectively comprise what is referred to herein as a swingable drop gate. The ends of the arms joined to shaft 42 form the upstream margin of this drop gate, and the opposite ends of the arms form the downstream margin of the drop gate. The drop gate is swingable about the pivot axis provided by shaft 43, which axis extends transversely of the path of movement for a board to a lowered position as shown for the left hand bin in FIG. 2. In swinging to a lowered position, the downstream margin of the gate swings downwardly.

Powered means for moving the gate, referred to as a gate operator, is shown at 50, and such comprises an extensible-contractible ram connected to the drop gate through a lever arm 52 and hinge shaft 43. On contraction of the ram, the downstream margin of the gate is swung downwardly to the lowered position shown for the left and right hand bins in FIG. 2. Extension of the ram returns the gate to a substantially horizontal position. The ram is fact acting, and drops the gate downward with sufficient rapidity to remove all supports from a board prior to any appreciable downward acceleration occurring in the board. As a result, the board drops downwardly, without any turning movement imparted to it. This means that a board, such as board 53 in FIG. 2, drops with its underside maintained facing downwardly.

As perhaps best illustrated in FIG. 1, a pair of elongated slats 56 are secured to the undersides of arms 42 in a gate. A sensing device 58 is mounted on these slats. The sensing device shown in FIG. 1 includes a pair of microswitches presenting spaced-apart contacts 60 which project upwardly from the device and into the plane of the upper surfaces of arms 42. The switches in the sensing device are connected to a suitable solenoid-operated valve (not shown) controlling pressure fluid flow to ram 50. If a board conveyed over arms 42 of the gate shown in FIG. 1 engages both contacts the ram for the gate is caused to drop the gate out from under the board, thus opening the bin below for the reception of the board. The spacing between the contacts may be used to sense board width, and the position of a sensing device in a direction extending laterally of the path of boards is used to sense board length.

Typical positioning of sensing devices associated with successive drop gates in the apparatus is illustrated in simplified form in FIG. 3. The apparatus illustrated is for sorting boards into varying size ranges with relation to both their length and width. In the figure four bins, $B_1$, $B_2$, $B_3$, and $B_4$, are indicated, and the drop gate above each is illustrated in simplified form. A datum line 61 is provided at the bottom of the figure to indicate a line with which one end of each board conveyed through the apparatus is aligned prior to being moved over the bins.

The sensing devices are positioned to make two width sorts for each length sort of boards. Explaining further, it will be seen that sensing device 58 for bin $B_1$, and a sensing devices 58' for bin $B_2$ are spaced equal distances from line 61. Boards which are longer than the distance between line 61 and the sensing devices travel over both devices. A board, such as the one illustrated in phantom outline at 64, having sufficient length and width to contact both contacts 60 of sensing device 58 will cause the drop gate for bin $B_1$ to drop down. A board such as the one illustrated at 65, of similar length, but having insufficient width to span both contacts 60, will pass over the drop gate for bin $B_1$. It will, however, contact the single contact of sensing device 58'. This causes the drop gate for bin $B_2$ to drop the board.

Boards having lengths less than the distance between datum line 61 and the sensing devices for bins $B_1$, $B_2$ are conveyed over sensing devices 58", 58''' for bins $B_3$, $B_4$, which are closer to the datum line. These sensing devices produce width sorts in a manner similar to width sorting previously described.

Referring again to FIGS. 1 and 2, pivotally mounted on the support frame beneath the drop gate of a bin are a number of laterally, spaced-apart, elongated arms 66. The arms are rigidly secured at one set of their ends to an elongated rod 68 (see FIG. 1). Rod 68 is journaled on a support frame for rotation about a pivot axis paralleling the pivot axis for a drop gate. Arms 66 constitute a gate or frame structure, referred to herein as an accumulator.

An accumulator is movable between a normally lowered or open position, as illustrated for the right hand bin in FIG. 2, where the accumulator is vertical, and an accumulating position where it is disposed in a substantially horizontal position beneath a drop gate, as seen in connection with the left hand bin in FIG. 2. With the accumulator in its accumulating position, its downstream margin is positioned closely adjacent fender structure 72 which projects into the bin opposite the accumulator.

A lever arm 80 is secured to rod 68, and an accumulator actuating means 82, in the form of an extensible-contractible ram, is operatively connected to lever arm 80 for swinging the accumulator between its lowered and raised positions.

The accumulator when in its raised or accumulating position is adapted to retain boards dropped into the bin at an elevation above the bottom of the bin. With the accumulator thus retaining boards, the bottom of the bin may be unloaded, without being hindered by boards falling onto the collector. After the bottom of the bin has been closed, the accumulator may be swung to its open position, with any boards retained thereon then falling freely to stack on the collector. The accumulator moves abruptly to move out from under boards, in the same manner as does a drop gate.

A counter 86 for each bin is secured to each of the fender structures 72, so that it registers each time ram 50 for the bin swings its associated drop gate downwardly to drop a board. The counter thus keeps a running count of the number of boards which have been dropped into the bin. On a predetermined quantity dropping into the bin, ram 82 may be automatically controlled by the counter to swing the accumulator to its accumulating position.

The method of operation for such lumber sorting apparatus will now be described. A board on moving along the sorting line is supported through its downwardly facing side on the support plane provided by the upper surfaces of arms 40, 42. A conveying force is imparted to the board through its upstream edge, by the conveyer chains, whereby it is moved along a defined path extending over the bins.

The sensing devices sense board width and length. When a board of a certain size moves over the station where such is collected, the drop gate in the station swings down to drop the board into the bin. The board drops without turning and with its downwardly facing side maintained facing downwardly. The importance of having a fast-acting ram for actuating a drop gate has already been discussed. It is also important, in obtaining rapid removal of support from under the board, that the drop gate swings as described, which is downwardly and against the direction in which boards are conveyed. By moving the drop gate in this manner, the forward momentum of the board produced by the conveyer tends to throw the board beyond the gate, not into it.

This same method is repeated until a predetermined quantity of boards has been collected in a bin, at which time the counter associated with that bin actuates the accumulator whereby it moves into its accumulating position to retain boards. A workman may then unload the bin, which is accomplished by releasing catch mechanism 28.

It should be recognized that each upright support frame in the apparatus may have supported thereon a drop gate, an accumulator, fender structure, etc. whereby with assembly of multiple ones of such frames one after another, a multiple bin sorting line is produced. The modular type of construction contemplated makes it an easy matter to build a sorting line with any desired number of sorting stations.

With boards falling in the sorting line, without being subjected to a tuning movement about their longitudinal axes, they tend to fall flatwise on the collector at the base of the bin and subsequently buildup as a stack with all boards oriented parallel to each other. Edge damage and skewing of the boards as they collect is effectively minimized. It has been found, for instance, that if boards are subjected to a halfturn or more and are undergoing appreciable rotational movement as they fall appreciable edge damage can result upon the boards striking a supporting surface. Further, the boards will tend to bounce on striking such surface and subsequently be subjected to a skewing action resulting in considerable disarray of the boards when collected in appreciable numbers.

While an embodiment of the invention has been described, it should be obvious that variations and modifications are possible. It is not intended by this invention to exclude arrangements which would be obvious to one skilled in the art.

It is claimed and desired to secure by Letters Patent:
1. In lumber sorting apparatus
a bin for collecting boards,
conveyer means disposed above said bin for moving boards, one after another, along a path over the bin, said conveyer means having a construction permitting it to move boards without supporting the undersides of the boards,
support means for supporting the undersides of such boards as they are moved by said conveyer means, said support means including a swingable drop gate disposed in a substantially horizontal position extending over the bin and having opposed upstream and downstream margins, and hinge means pivotally mounting the upstream margin of the gate providing a pivot axis for the gate extending transversely of said path accommodating downward swinging of the gate's downstream margin, thus to open the bin and permit a board supported on the gate to drop into the bin, and a motor connected to the gate operable on actuation to swing the gate's downstream margin downwardly.

2. The apparatus of claim 1, wherein said motor comprises a fast acting ram actuatable to swing the gate's downstream margin downwardly at a speed greater than the free fall rate for a board supported on the gate.

3. The apparatus of claim 1, wherein said bin comprises means adjacent the bottom of the bin for unloading boards dropped thereinto, and which further comprises an accumulator disposed intermediate the top and bottom of the bin which is movable between a normally open position where boards may fall freely past the accumulator to the bottom of the bin and an accumulating position where boards are retained by the accumulator.

4. The apparatus of claim 3, which further comprises accumulator actuating means operable to determine the quantity of boards dropped into the bin and being operable to move the accumulator to its said accumulating position on a predetermined quantity being attained.

5. The apparatus of claim 3, wherein said accumulator comprises a frame structure which presents in its accumulating position an upper surface which occupies a substantially horizontal plane beneath said gate, and having opposed upstream and downstream margins, and pivot means pivotally mounting the upstream margin of the frame structure for swinging about a pivot axis which extends substantially parallel to the pivot axis for the gate to accommodate downward swinging of the frame structure's downstream margin.

6. The apparatus of claim 4, wherein said drop gate, motor, accumulator, accumulator actuating means, and means for unloading boards are all supported on a common upright support frame which extends transversely of said path and to which similar support frames may be connected, one after the other along said path, to provide for any desired number of sorts.

7. A method of sorting lumber which comprises positioning a board with one of its sides facing downwardly, imparting a conveying force to said board through contacting regions of the board other than its downwardly facing side and in a manner to cause the same to move laterally,
supporting the board through its downwardly facing side while such conveying force is imparted to it whereby it is moved along a defined path which includes a portion extending over a sorting station,
upon movement of the board over said station removing the support for its downwardly facing side with sufficient rapidity to permit free fall of the board with such board dropping during free fall with its downwardly facing side maintained facing downwardly, and
collecting such board on a collector with the board falling onto the collector in substantially the position maintained during free fall.

8. The method of claim 7 wherein multiple boards are sorted as set forth in claim 7, and these are collected as a stack on the collector.

References Cited
UNITED STATES PATENTS 3,080,052   3/1963   Hanbury _____ 209—82X
3,085,686   4/1963   Hanbury _____ 209—82

ALLEN N. KNOWLES, Primary Examiner

G. A. CHURCH, Assistant Examiner

U.S. Cl. X.R.
209—74, 90